(12) United States Patent
Mori et al.

(10) Patent No.: US 8,643,893 B2
(45) Date of Patent: Feb. 4, 2014

(54) APPARATUS, METHOD, SYSTEM, AND COMPUTER PROGRAM PRODUCT FOR CREATING OPERATION DEFINITION FILE, AND IMAGE FORMING APPARATUS

(75) Inventors: Miyuki Mori, Kanagawa (JP); Shintaroh Takahashi, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 581 days.

(21) Appl. No.: 12/656,717

(22) Filed: Feb. 16, 2010

(65) Prior Publication Data
US 2010/0208283 A1    Aug. 19, 2010

(30) Foreign Application Priority Data
Feb. 17, 2009 (JP) ................................ 2009-034052

(51) Int. Cl.
| H04N 1/60 | (2006.01) |
| G06F 3/12 | (2006.01) |
| G06K 15/00 | (2006.01) |
| G06F 15/00 | (2006.01) |
| G06K 1/00 | (2006.01) |

(52) U.S. Cl.
USPC .......... 358/1.9; 358/1.13; 358/1.15; 358/1.16

(58) Field of Classification Search
USPC .................... 358/1.9, 1.15, 1.16, 1.13
See application file for complete search history.

(56) References Cited

U.S. PATENT DOCUMENTS

| 6,940,615 B1* | 9/2005 | Shima ........................ 358/1.15 |
| 2003/0043406 A1* | 3/2003 | Wells et al. ................ 358/1.15 |
| 2006/0224780 A1 | 10/2006 | Saito |
| 2007/0094421 A1 | 4/2007 | Wu |
| 2008/0158578 A1* | 7/2008 | Kadota ......................... 358/1.9 |
| 2008/0159768 A1* | 7/2008 | Katoh et al. ................... 399/79 |
| 2008/0278740 A1* | 11/2008 | Bird et al. ................... 358/1.15 |
| 2008/0294845 A1 | 11/2008 | Kawajiri |
| 2009/0247122 A1* | 10/2009 | Fitzgerald et al. ........... 455/410 |
| 2010/0060929 A1* | 3/2010 | Koizumi ..................... 358/1.15 |

FOREIGN PATENT DOCUMENTS

| JP | 2002-334047 | 11/2002 |
| JP | 3704246 | 7/2005 |
| JP | 3784717 | 3/2006 |
| JP | 2006099360 A | 4/2006 |
| JP | 2006139489 A | 6/2006 |
| JP | 2006146655 A | 6/2006 |

OTHER PUBLICATIONS

Abstract of JP 2000-216788 published Aug. 4, 2000 corresponding to JP 3704246.
Abstract of JP 2003-198770 published Jul. 11, 2003 corresponding to JP 3784717.
Japanese Office Action dated Feb. 19, 2013 for corresponding Japanese Application No. 2009-034052.

* cited by examiner

Primary Examiner — Fred Guillermety
(74) Attorney, Agent, or Firm — Harness, Dickey & Pierce, PLC

(57) ABSTRACT

An operation-definition-file creating apparatus includes a setting data file in which setting data of a setting item that is to be set in an MFP is defined. A creating unit creates, on the basis of the setting data, an operation definition file in which an operation for reflecting the setting data in the MFP is described and a saving unit saves the created operation definition file in an external storage medium.

8 Claims, 16 Drawing Sheets

FIG. 2

| ITEM | VALUE | INTERNAL | NOTE |
|---|---|---|---|
| MODEL NAME | A-1 | 00001 | TARGET MODEL NAME |
| VERSION | VER 1.0 | VER 1.0 | VERSION OF THE APPLICATION IN EXTERNAL STORAGE MEDIUM |
| FILE VERSION | 1.0 | 1.0 | FREE DEFINED |
| BUTTON NAME | DEAL NAME | DEAL NAME | FREE DEFINED. NAME WHICH IS DISPLAYED ON THE OPERATION PANEL |
| | | 02 | LANGUAGE (ENGLISH) |

FIG. 3

| | A | B | C | D | E |
|---|---|---|---|---|---|
| 1 | DATA | | | | |
| 2 | KEY | NAME | VALUE | INTERNAL | MEMO |
| 3 | MODEL A | MODEL | A | 00001 | |
| 4 | MODEL B | MODEL | B | 00002 | |
| 5 | MODEL C | MODEL | C | 00003 | |
| 6 | ... | ... | ... | ... | ... |
| 12 | ONOFFON | ONOFF | ON | 0 | |
| 13 | ONOFFOFF | ONOFF | OFF | 1 | |
| 14 | OFFONOFF | OFFON | OFF | 0 | |

FIG. 4

| A | B | C | D | E | F | G | H | I | J | K | L |
|---|---|---|---|---|---|---|---|---|---|---|---|
| ITEM | | | | | | | | | | | |
| | | | | VALUE | NOTE | COMMENT | INTER-NAL | DATA TYPE | CONFI1 | PJL | API |
| SYSTEM | GENERAL FEATURES | DEVICE NAME | | ... | MAX: 100 LETTERS | | | DAT2 | 000-111 | | |
| | | COMMENT | | ... | MAX: 30 LETTERS | | | DAT2 | ... | | |
| | | LOCATION | | | | | | | | | |
| | | SPOOL PRINTING | | ▼ | | | | DAT1 | | | |
| | | PROTECT PRINTER DISPLAY PANEL | | ENABLE DISABLE | | | | DAT1 | | | |
| | | PRINT PRIORITY | | PRINTER | | | | DAT1 | | | |

FIG. 9

HEADER PORTION (1)label,(2)jump,(3)sequence command,(4)Confi1 type,(5)dat1(min),(6)dat2(max),(7)temp mem,(8)term proc,(9)cond,(10)disp str1,(11)disp str2,(12)err str1,(13)err str2
1.0,Apl1.0,ModelA,,,,,,,,,00001
$FACT_PROC_1,,unlimited,no_mcode,Deal Name,Deal Name,,,,,,,,
,,disable_process_flag,,,,,,,,,

FIG. 10

BODY PORTION

,,000-111,Write,,DeviceA,,,,Device Settings,Device Settings,Device Name/DeviceA/,Device Name/Display IP Address on Device Display Panel/Disable/

FOOTER PORTION $ACTION_END,,,,,,,,,,,,
  ...
  ...
DETERMINE WHETHER ADMINISTRATOR AUTHENTICATION IS REQUIRED FOR APPARATUS,,,,,,,,,,,,
,,while,,,,,,,,,,,
  ...
  ...
,,while end,,,,,break,,,,,
IF YES, PERFORM AUTHENTICATION,,,,,,,,,,,,,
,,while,,,,,,,,,,
  ...
LOGIN,,,,,,,,,,
,,while,,,,,,,,,,
,,check_admin_logon,,,,,break,,PLEASE LOGIN AS MACHINE ADMINISTRATOR. ,Please login as machine administrator. ,,
  ...
,,check_pass_code,,,,,,,INPUT THE PASSCODE. ,Input the passcode. ,,

APPARATUS, METHOD, SYSTEM, AND COMPUTER PROGRAM PRODUCT FOR CREATING OPERATION DEFINITION FILE, AND IMAGE FORMING APPARATUS

CROSS-REFERENCE TO RELATED APPLICATIONS

The present application claims priority to and incorporates by reference the entire contents of Japanese Patent Application No. 2009-034052 filed in Japan on Feb. 17, 2009.

BACKGROUND OF THE INVENTION

1. Field of the Invention

The present invention relates to an apparatus, system, method, and computer program product capable of creating an operation definition file in which is described operations for setting items with respect to an image forming apparatus.

2. Description of the Related Art

When image forming apparatuses are shipped, it is necessary to set various kinds of setting data for various kinds of setting items for each model. A large number of conventional technologies for setting various kinds of setting data of the setting items in image forming apparatuses are known (for example, see Japanese Patent No. 3704246 and Japanese Patent No. 3784717, and Japanese Patent Application Laid-open No. 2002-334047).

Considerable time is required to set the setting data for the setting items for each model. Moreover, there are high chances of making an error in the setting operation. The following conventional method is available to take care of these drawbacks. That is, setting data of setting items to be reflected in image forming apparatus is set in a sequence file; the sequence file is stored in an external storage medium, such as a SD card, that is prepared for the number of image forming apparatuses; the external storage medium is communicably connected to a corresponding one of the image forming apparatuses; and a process application is started so that the setting data stored in the sequence file in the external storage medium is set at one step in the image forming apparatus. The process application is an application program, which is operated in the image forming apparatus, used for reflecting the setting data stored in the sequence file in the external storage medium in the image forming apparatus.

When the image forming apparatus is shipped from distributors, for example, sales companies, sales agents, remote-based service locations, overseas manufacturing plants, or the like, the manufacturer of the image forming apparatuses receives, from a distributor, a request for creating a sequence file together with a setting instruction based on the specifications for the image forming apparatus to be shipped. Then, the manufacturer creates a sequence file, in which setting data based on the setting items and the setting instruction is described, saves it in an external storage medium, and sends the external storage medium to the distributor. Thereafter, the distributor activates a process application on the image forming apparatus side to reflect the setting data on the basis of the sequence file stored in the external storage medium and then ships the image forming apparatus.

However, when the sequence file is created at the manufacturer, the person in charge of creating the sequence file is often required to confirm distributors, such as sales companies, sales agents, remote-based service locations, overseas manufacturing plants, or the like, and the specifications, i.e., content of the setting, for the image forming apparatus for a shipment. This process is time taking and troublesome.

Furthermore, because the process is time taking, a setting operation of the image forming apparatus using such a sequence file can be performed with a shipment volume of about up to only 100 units.

Therefore, when the image forming apparatuses are shipped by the distributors, such as sales companies, sales agents, remote-based service locations, overseas manufacturing plants, or the like, a method that allows a setting operation to be performed by distributors only by themselves is thus desired.

SUMMARY OF THE INVENTION

It is an object of the present invention to at least partially solve the problems in the conventional technology.

According to an aspect of the present invention, there is provided an operation-definition-file creating apparatus including a storing unit that stores therein a setting data file in which setting data of a setting item that is to be set in an image forming apparatus is defined; a creating unit that creates, on the basis of the setting data, an operation definition file in which an operation for reflecting the setting data in the image forming apparatus is described; and a saving unit that saves the created operation definition file in an external storage medium.

According to another aspect of the present invention, there is provided a method of creating an operation definition file that is executed in an operation-definition-file creating apparatus. The method includes storing in a storing unit a setting data file in which setting data of a setting item that is to be set in an image forming apparatus is defined; creating an operation definition file in which an operation for reflecting the setting data in the image forming apparatus by a creating unit; and saving the created operation definition file in an external storage medium.

According to still another aspect of the present invention, there is provided a computer program product that includes a computer-readable recording medium program and a computer program recorded on the readable recording medium program, the computer program when read and executed on a computer causes the computer to execute a method of creating an operation definition file that is executed in an operation-definition-file creating apparatus. The computer program causes the computer to execute storing in a storing unit a setting data file in which setting data of a setting item that is to be set in an image forming apparatus is defined; creating an operation definition file in which an operation for reflecting the setting data in the image forming apparatus by a creating unit; and saving the created operation definition file in an external storage medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic diagram illustrating a data structure of a general sheet in a setting data file;

FIG. 3 is a schematic diagram illustrating a data structure of a data sheet in the setting data file;

FIG. 4 is a schematic diagram illustrating a data structure of a setting-value input sheet in the setting data file;

FIG. 9 is an explanatory diagram illustrating an example of a header portion of the operation definition file;

FIG. 10 is an explanatory diagram illustrating an example of a body portion of the operation definition file;

DETAILED DESCRIPTION OF THE PREFERRED EMBODIMENTS

Exemplary embodiments of the present invention are described in detail below with reference to the accompanying drawings.

Figure 1:
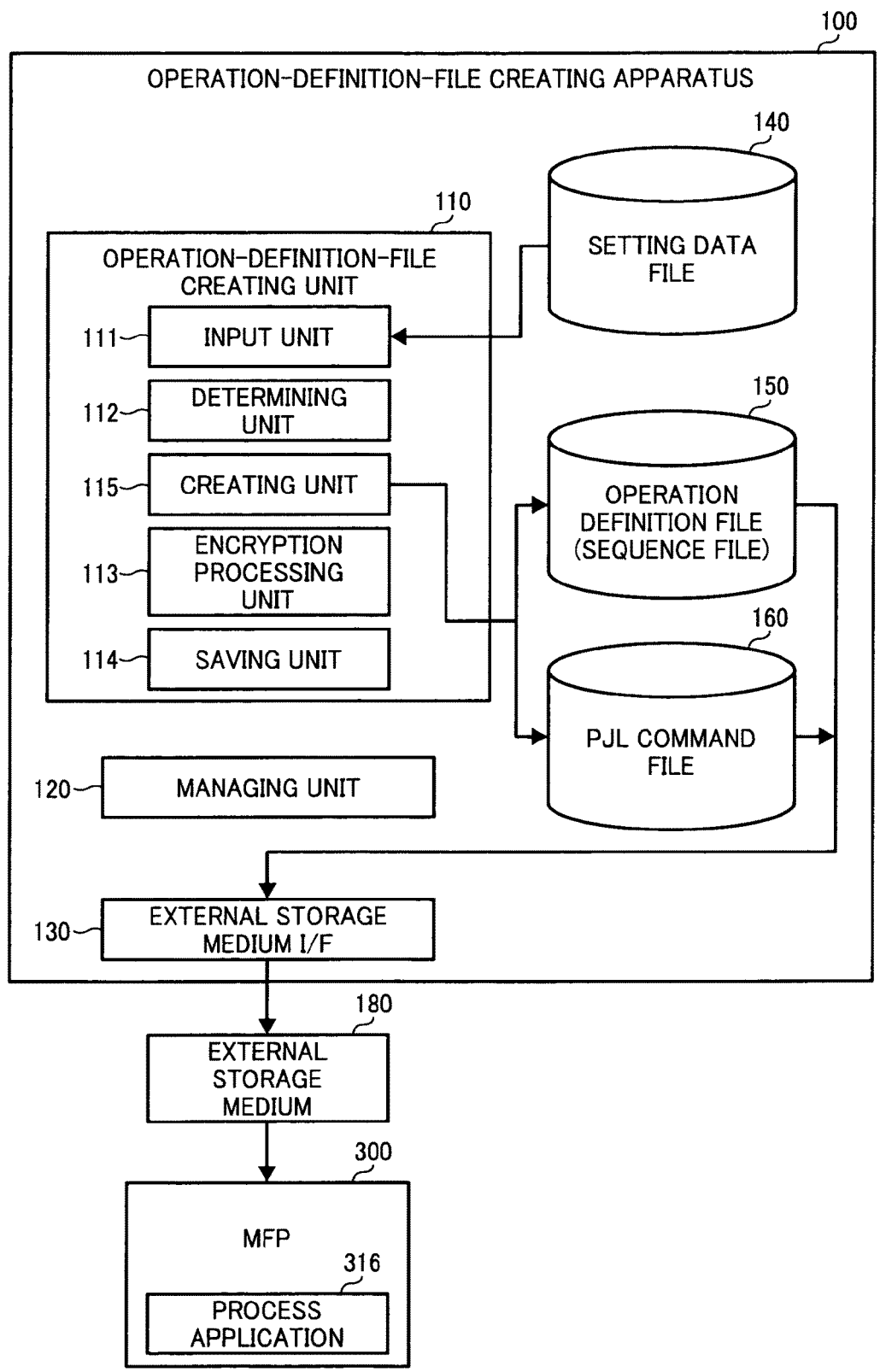
FIG. 1 is a block diagram illustrating an exemplary functional configuration of an operation-definition-file creating apparatus according to a first embodiment of the present invention.

FIG. 1 is a block diagram illustrating an exemplary functional configuration of an operation-definition-file creating apparatus 100 according to a first embodiment. The operation-definition-file creating apparatus 100 is located at, for example, an MFP manufacturer or the like in Japan, and an MFP 300 to be shipped is located at, for example, an overseas sales company.

The operation-definition-file creating apparatus 100 includes an operation-definition-file creating unit 110, a setting data file 140, a managing unit 120, and an external storage medium interface 130 (hereinafter, "external storage medium I/F 130").

The operation-definition-file creating apparatus 100 also includes a control device such as a CPU, a storage device such as a read only memory (ROM) and a random access memory (RAM), an external storage device such as a hard disk drive (HDD) and a CD drive, a display unit such as a display device, and an input device such as a keyboard or a mouse that are omitted from FIG. 1. The operation-definition-file creating apparatus 100 has a hardware configuration that is same of substantially similar to that of a commonly known computer.

The setting data file 140 is a data file in which setting data of a setting item to be set in the MFP 300 is defined by a process application 316, described later, in the MFP 300 serving as an image forming apparatus. The setting data file 140 is stored in a storage medium such as the HDD or a memory.

The operation-definition-file creating unit 110 creates, from setting data in the setting data file, an operation definition file 150 and a PJL command file 160 in the storage medium such as the HDD or the memory.

The operation definition file 150 mentioned here, which is sometimes referred to as a sequence file, is a data file in which an operation that is used to reflect the setting data in the MFP is described in a simple command language. The PJL command file 160 is a data file in which a PJL command is registered. The PJL command is described in a printer job language (PJL) that is related to a print setting performed on the MFP 300. The setting data file 140, the operation definition file 150, and the PJL command file 160 are described in detail later.

As shown in FIG. 1, the operation-definition-file creating unit 110 mainly includes an input unit 111, a determining unit 112, a creating unit 115, an encryption processing unit 113, and a saving unit 114.

The input unit 111 reads the setting data file 140 from the storage medium such as the HDD or the like and inputs the setting data file 140.

The determining unit 112 determines, from the type of the setting data, whether the setting data in the setting data file is data in a setting-1 mode (setting-1 data), which can be used only by an administrator such as a serviceperson or the like (administrator data). The determining unit 112 determines, from the type of the setting data, whether the setting data is data related to an API command that is provided by an application program interface (API) in the MFP. Furthermore, the determining unit 112 determines, from the type of the setting data, whether each pieces of the setting data in the setting data file 140 is data related to the PJL for the MFP 300.

If the setting data is setting-1 data, the creating unit 115 describes a setting-1 operation request command. If the setting data is data for the API command, the creating unit 115 describes the API command, and then creates the operation definition file in the storage medium. Furthermore, if the setting data is the data related to the PJL, the creating unit 115 describes the PJL command and creates the PJL command file in the storage medium.

The encryption processing unit 113 performs encryption, using an encryption key, of the operation definition file 150 and the PJL command file 160 that are created in the creating unit 115. The encryption processing unit 113 stores the encrypted operation definition file 150 and the encrypted PJL command file 160 in the storage medium such as the HDD or the memory.

The encryption processing is performed using a 3 DES (triple DES) method with an encryption key of 196 bits. However, the encryption processing can be performed by any other method.

The saving unit 114 saves the encrypted operation definition file 150 and the encrypted PJL command file 160 stored in the storage medium in an external storage medium 180 via the external storage medium I/F 130. The external storage medium 180 can be an SD card, a USB memory, or the like.

However, some other external storage medium can be used. The external storage medium I/F 130 is an interface that holds the external storage medium 180 in a detachable manner. For example, if the external storage medium 180 is an SD card, the external storage medium I/F 130 is the interface for the SD card, and if the external storage medium 180 is a USB memory, the external storage medium I/F 130 is an USB interface; however, the configuration is not limited thereto.

When the setting data file 140 is used for development purpose, the managing unit 120 serves as a tool to hide a part of the setting data of the setting item in the setting data file 140.

The setting data file 140 is described in detail below. The setting data file 140 is table data in a Microsoft (registered trademark) Excel (registered trademark) format and is constituted by a plurality of sheets for each intended purpose. In the embodiment, table data in an Excel (registered trademark) format is used for the setting data file 140; however, the file format is not limited thereto, provided that the setting data of the setting item can be set therein.

A user inputs, in the setting data file 140, information, such as the setting data to be set in the MFP 300 by the process application 316 in the MFP 300, a version of the process application 316, the model of the MFP 300, and the like. To create the operation definition file 150 and the PJL command file 160, as a pair, one setting data file 140 is required.

The setting data file 140 includes a plurality of general sheets, data sheets, and setting-value input sheets for each intended purpose.

The general sheet is a sheet in which settings related to the whole operation definition file 150 are input. FIG. 2 is a schematic diagram illustrating a data structure of the general sheet in the setting data file 140. As shown in FIG. 2, the general sheet includes an item column, a value column, an internal column, and a note column. The "item" represents an item name. The "value" represents setting data that is set in the item name, i.e., the "item", which is input by the user. In the "internal", a developer describes a calculating formula in such a manner that a value is reflected in accordance with a value in the "value", which is the setting data reflected in the operation definition file 150. The "note" represents information containing hints for the user when the user inputs the setting data, which is described by the developer.

The data sheet is a sheet used for registering both of a value that can be selectable using a drop-down list and an internal value linked to the value. FIG. 3 is a schematic diagram illustrating a data structure of the data sheet in the setting data file 140.

As shown in FIG. 3, the data sheet includes a key column, a name column, a value column, an internal column, and a memo column. The "key" represents data in which the "name" and a "model" are linked and is a key for retrieval. The "name" represents a group name; items having the same "name" are indicative of belonging to the same group. The "name" is displayed on the pull-down list. The "value" represents data that is displayed on the pull-down list. The "internal" represents an internal setting value of setting-1 that is described in the operation definition file 150 in association with the "value". The setting-1 mentioned here represents the setting item that can be set only by an administrator such as a serviceperson, and a setting-1 mode represents a mode that can be set only by the serviceperson. A setting-2 represents a setting item that can be set by the user, and a setting-2 mode represents a mode that can be set only by the user.

In the example illustrated in FIG. 3, a symbol such as "A", "B", or "C" is displayed as a candidate in the pull-down list to which the "model" in the "name" is allocated.

The setting-value input sheet is a sheet to which the user inputs setting data (setting value). FIG. 4 is a schematic diagram illustrating an example of a data structure of the setting-value input sheet in the setting data file 140. The setting-value input sheet includes sheets with different sheet names for each intended purpose, including, in the embodiment, a setting-1 sheet, sheets for each device (printer, facsimile machine, or the like), etc. The setting-1 sheet mentioned here is a sheet to which an item that is set in the setting-1 mode is input. The sheets for each device are sheets to which the setting data of the setting item that is set for each device (Setting) is input. The sheets for each device can be arbitrarily determined according to the number of devices.

The plurality of setting-value input sheets has the same structure. The above described sheets are only examples; various kinds of sheets can be used as the setting-value input sheet according to the purpose.

As shown in FIG. 4, the setting-value input sheet includes types indicating sheet types and the number of items to be set indicating the number of items that have been set. Among the sheet types, the sheet in which "command" is set is used for the setting-value input sheet.

The setting-value input sheet includes an item column, a value column, a note column, a comment column, an internal column, a data type column, a confi1 column, a PJL column, and an API column. The accessible cells for the user are only the value column and the comment column.

If the setting data is a numerical value, the minimum length and the maximum length of the numerical value are checked. If the setting data is a character string, the minimum length and the maximum length of the character string are not checked. Moreover, the inconsistency due to the combination of the setting data is not checked; however, it is also possible to configure in such a manner to check these items.

The "item" represents a name of the setting item and is described in association with a hierarchy of the setting-2 for each category. The user inputs, to the "value", the setting data associated with the setting item ("item"). If the setting data is selection type data, a pull-down list is displayed as shown in FIG. 4, and the setting data selected by the pull-down list is input. If the setting data is not input in the "value", no data is output to the operation definition file 150.

In the "note", a supplementary content in terms of the setting data to be input is described. The "comment" is used for the user to freely input a comment, and the input comment thereto does not affect the operation definition file 150.

The "internal" represents an internal setting value with respect to the "value"; a value corresponding to a calculating formula is obtained. The "data type" represents a setting data type, i.e., a data type of the setting data. The items to which "data1", "data2", or "data0" is input are output to the operation definition file 150.

The "confi1" represents a setting-1 mode number (setting-1 number) with respect to the setting item. The "PJL" represents a PJL command with respect to the setting item. The items to which the "PJL" is input are output to the PJL command file 160. The "API" is the API with respect to the setting item.

Figure 5:
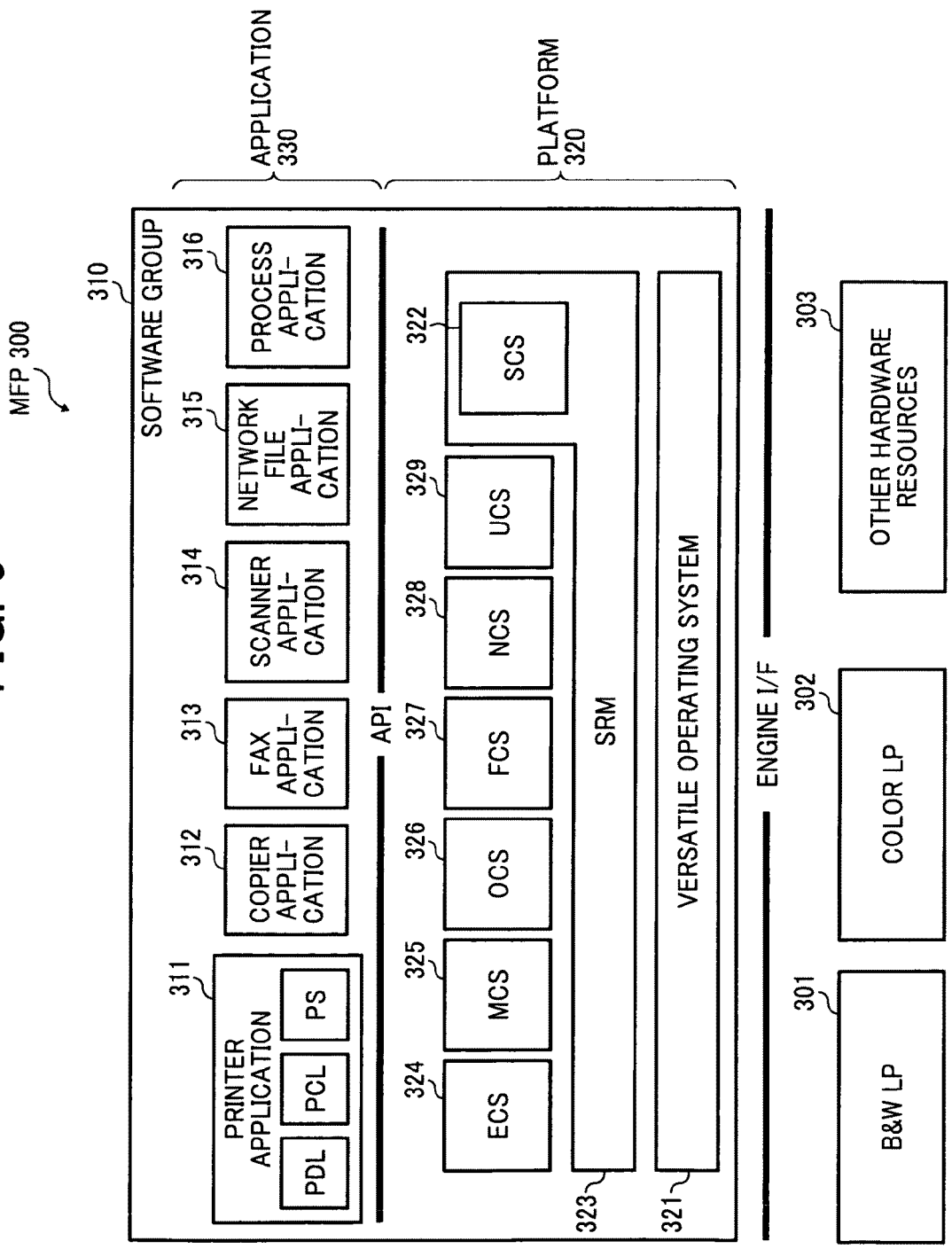
FIG. 5 is a block diagram illustrating an exemplary functional configuration of an MFP shown in FIG. 1.

The MFP 300 is described below in detail. FIG. 5 is a block diagram illustrating the functional configuration of the MFP 300. The MFP 300 includes a black-and-white line printer (B&W LP) 301, a color line printer (Color LP) 302, other hardware resources 303 such as external storage medium interfaces, and the like. A software group 310 includes a platform 320 and an application 330.

The platform 320 includes a control service described below that interprets processing requests received from the application 330 and generates acquisition requests for hardware resources; a system resource manager (SRM) 323 that manages a hardware resource or a plurality of hardware resources and mediates the acquisition requests from the control service; and a versatile operating system 321.

The control service includes a plurality of service modules. Specifically, the control service includes a system control service (SCS) 322, an engine control service (ECS) 324, a memory control service (MCS) 325, an operation panel control service (OCS) 326, a FAX control service (FCS) 327, a network control service (NCS) 328, and a user control service (UCS) 329. The platform 320 includes an application program interface that can receive the processing request from the application on the basis of a function defined in advance.

The versatile operating system 321 is a general purpose operating system such as UNIX (registered trademark) and performs a parallel execution as a process of each piece of the software included in the platform 320 and the application 330. The use of the open source UNIX (registered trademark) makes it possible to ensure the reliability of the program, support for a network, and to easily obtain source codes. Furthermore, no royalty for the OS or the TCP/IP is needed, whereby outsourcing is facilitated.

The SRM 323 controls the system and manages the resources together with the SCS 322. The SRM 323 mediates according to a request from a higher layer that uses the hardware resources, such as an engine unit including a scanner or a plotter, a memory, an HDD file, and a host I/O (Centronics I/F, network I/F, IEEE 1394 I/F, RS232C I/F, etc.), and performs execution control.

Specifically, the SRM 323 determines whether the requested hardware resource is available (whether the requested hardware resource is not being used due to another request). If it is available, the SRM 323 informs the higher layer that the requested hardware resource is available. Alternatively, the SRM 323 can schedules the availability of the hardware resources with respect to a request from the higher layer and directly performs the content of the request (e.g., paper conveyance and image forming operation performed by a printer engine, allocation of memory, creation of files, etc.).

The SCS 322 performs processes such as (1) application management, (2) operating unit control, (3) system screen display (job-list screen, counter display screen, etc.), (4) LED display, (5) resource management, and (6) interrupt application control. Specifically, in the process of (1) application management, the SCS 322 registers applications and notifies other applications of the information thereof. The SCS 322 notifies the registered applications of the status of the engine unit according to a system setting and a setting requested from the application. Furthermore, to the registered application, the SCS 322 sends a query about availability, e.g., about whether to change a power mode, and whether to allow an interrupt mode, for transition of the system status.

In the process of (2) operating unit control, the SCS 322 performs an exclusive access control of an operating-unit use right for the application. Then, the SCS 322 exclusively notifies key information received from the operating-unit driver (OCS) to the application that has the use right for the operating unit. The key information performs a mask control in which notification is temporality halted in accordance with a transition of the system status such as switching the applications or the like.

In the process of (3) system screen display, the SCS 322 displays a warning screen indicating the status of the engine unit in accordance with the content requested from the application that has the operating-unit use right. The SCS 322 also has a function of turning on/off a display of a warning in accordance with the application status such as a user-access restriction on screen. Regarding other than the status of the engine unit, the SCS 322 controls the displaying of a screen including a job-list screen that is used to display job reservations and the execution status of a job, a counter screen that is used to display a total counter, or the like, and a screen that indicates that a CSS is being reported. Regarding display of these system screens, instead of requesting to the application for releasing the operating-unit use right, rendering is performed as a system screen that covers the application screen.

In the process of (4) LED display, the SCS 322 controls of displaying a system LED such as a warning LED, an application key, or the like. An LED for a unique application is directly controlled by the application by using a driver for a display.

In the process of (5) resource management, when the application (ECS) executes a job, the SCS 322 provides a service for exclusive access control of the engine resources (scanner, staple, etc.) that need to be excluded. In the process of (6) interrupt application control, the SCS 322 performs a control and a service to allow a specific application to be preferentially operated.

The ECS 324 controls the engine unit such as the black-and-white line printer (B&W LP) 301, the color line printer (Color LP) 302, the other hardware resources 303, and the like and performs image reading, printing operation, status notification, jam recovery, and the like.

Specifically, the ECS 324 performs a series of copying/scanning/printing operations by issuing printing requests to the SRM 323 as required in accordance with a specification of a job mode received from the application 330. For the job to be handled by the ECS 324, it is assumed that a scanner (SCANNER) is specified to an image input device, or a plotter (PLOTTER) is specified to an image output device.

For example, in the case of the copy operation, "SCANNER→PLOTTER" is specified, in the case of storing files, "SCANNER→MEMORY" is specified, and in the case of sending a facsimile, "SCANNER→FAX_IN" is specified. When printing an accumulated file or printing from a printer application 311, "MEMORY→PLOTTER" is specified, and when receiving a facsimile, "FAX_OUT→PLOTTER" is specified.

Although the definition of a job depends on applications, an operation of processing a single set of image groups handled by the user is defined here as one job. For example, in the case of a copying operation in an automatic document feeder (ADF) mode, the operation of reading a set of originals placed on an original delivery table is one job, and in the case of a platen mode, a read operation until the final original is determined is one job. Furthermore, in the case of a copier application 312, an operation of copying a set of originals is one job, in the case of a fax application 313, an operation of transmitting one document or an operation of receiving one document is one job, and in the case of a printer application, an operation of printing one document is defined as one job.

The MCS 325 performs a memory control. Specifically, the MCS 325 acquires and releases an image memory, uses a hard disk drive (HDD), and compresses and decompresses image data.

Functions required for managing necessary information as image data files accumulated in the hard disk drive include (1) a file access (creation/deletion/open/close) function (including exclusive processing), (2) various types of file attribute management function such as file name/ID management (file/user)/password management/accumulated time management/number of pages/data format (compression type, etc.)/access restriction/application for creation/printing condition management (management as a file of image data in a physical page unit), (3) connection/insertion/cut functions in a file or a page unit (4) a file sort function (accumulated time order/user ID order, etc.), (5) notification function of all file information (for display/retrieval), (6) a recovery function (filing corrupted files/scrapping pages), (7) an automatic file deleting function, and the like.

Furthermore, functions to store image data in a memory, such as a RAM or the like, and access to the memory include (1) a function of acquiring a file and information on page/band attributes from the application 330, and (2) functions of allocating, releasing, reading, and writing a region of image data acquired from the application 330.

The OCS 326 is a module that controls an operation panel, serving as an information transmission unit, between an operator and a main body controller. The OCS 326 performs a process of notifying the main body controller of a key operation event performed by the operator, a process of providing a library function that is used for each application to construct GUI, and a process of managing the constructed GUI information for each application, a process of displaying the information on the operation panel, and the like.

The OCS 326 has (1) a function of providing a library for GUI construction, (2) a function of managing hardware resources in, the operating unit, (3) a VRAM rendering/LCD display function (display of hardware, switching displayed applications, switching displayed languages, dark colored display on window, display of a blinking message/icon, and display of a linked message), (4) a hard key entry detection function, (5) a touch panel key entry detection function, (6) an LED output function, and (7) a buzzer output function, and the like.

The FCS 327 provides, from each application layer of the system controller, an API for facsimile transmission and reception using a PSTN/ISDN network registration/citation of various kinds of facsimile data managed by BKM (backup SRAM), facsimile reading, facsimile reception printing, and merged transmission and reception.

Specifically, the FCS 327 has functions such as (1) a transmission function of transmitting a document requested for transmission from the application layer to a facsimile received using the PSTN/ISDN network, (2) a function of forwarding, to each application layer, a facsimile reception screen received from the PSTN/ISDN network and various types of reports to print, (3) a telephone directory citation/registration function of citing and registering facsimile management items such as a telephone directory or group information stored in a fax board, (4) a fax log notification function of notifying any application that requires historical information on transmission results stored in BKM mounted on the fax board, and (5) an event notification function of notifying an application registered in the FCS of a changed event when the status of the fax board is changed.

The NCS 328 is a group of modules for providing commonly available services to applications requiring network I/O. The NCS 328 distributes data, which is received by each protocol from the network side, to each of the applications, and mediates when the data is transmitted from the application to the network side. Specifically, the NCS 328 has a server daemon, such as ftpd, httpd, lpd, snmpd, telnetd, smtpd, etc., a client function of the protocol thereof, and so on.

The UCS 329 is a process that manages, using user database (not shown) or the like, user information on users who uses the MFP 300. The UCS 329 determines a storage device that stores the user information associated with a request, acquires the user information from the determined storage device, and supplies the user information to each of the applications.

The application 330 has a page description language (PDL), the printer application 311 serving as an application for a printer having PCL and PostScript (PS), the copier application 312 serving as an application for a copier, the fax application 313 serving as an application for a facsimile, a scanner application 314 serving as an application for a scanner, a network file application 315 serving as an application for network files, and the process application 316 serving as an application for checking processes. To execute an operation using each of the processes on the platform 320, a screen display control program that executes screen control, key operation control, and job creation are the main programs for the applications 311 to 316. Furthermore, a new application can be installed via a network that is connected by the NCS 328. Each of the applications can be added and deleted for each application. The process application 316 is described in detail later.

As described above, unlike the conventional MFP, the MFP 300 is not equipped with individual controller boards for each function, such as a printer, a copier, and a facsimile, and moreover, a printer application, a copy application, and a facsimile application are not simply operated on the common operating system in the MFP 300. In other words, in the MFP 300, the platform 320 performs processing, in an integrated manner, that is commonly required for each of the applications, thus improving development efficiency of each of the applications and productivity of all apparatuses.

Figure 6:
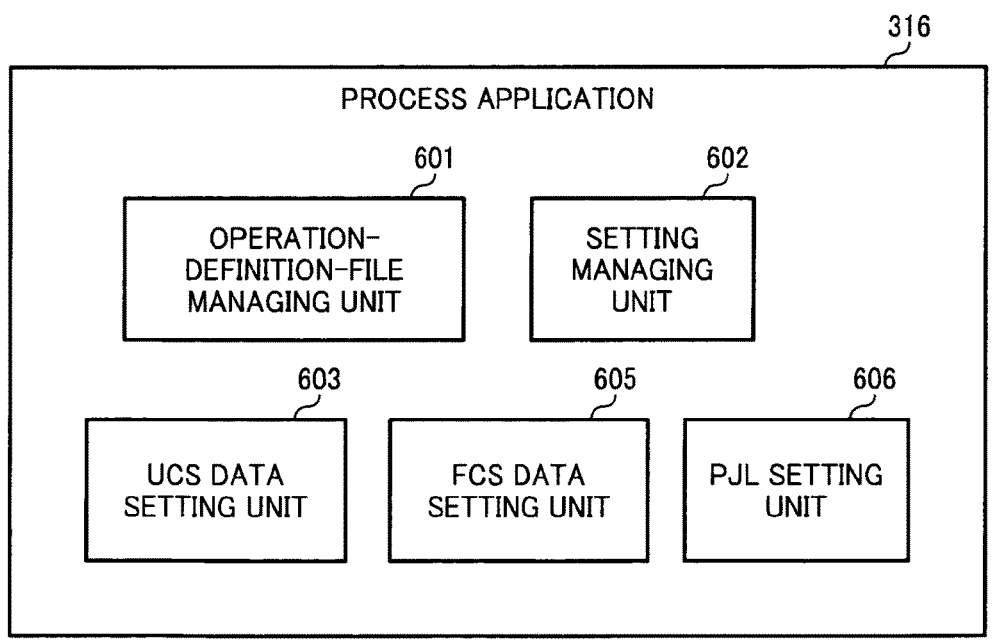
FIG. 6 is a block diagram illustrating an exemplary functional configuration of a process application shown in FIG. 5.

Next, the process application 316 that acts as the application 330 of the MFP 300 is described. FIG. 6 is a block diagram illustrating an exemplary functional configuration of the process application 316. As shown in FIG. 6, the process application 316 includes an operation-definition-file managing unit 601, a setting managing unit 602, an UCS data setting unit 603, an FCS data setting unit 605, and a PJL setting unit 606.

The operation-definition-file managing unit 601 reads the operation definition file 150 from the external storage medium 180, analyzes the operation definition file 150, and executes a command described in the operation definition file 150. The setting managing unit 602 performs setting, writing, and execution of the setting data in the setting-1 mode. The UCS data setting unit 603 performs UCS data setting, such as an LDAP server setting, an administrator information setting, and the like. The FCS data setting unit 605 performs an FCS data setting, such as a FAX setting, a FAX function detection setting, and the like. The PJL setting unit 606 reads and analyzes the PJL command file 160 stored in the external storage medium 180, executes the PJL command described in the PJL command file 160, and performs a printing operation.

Figure 7:
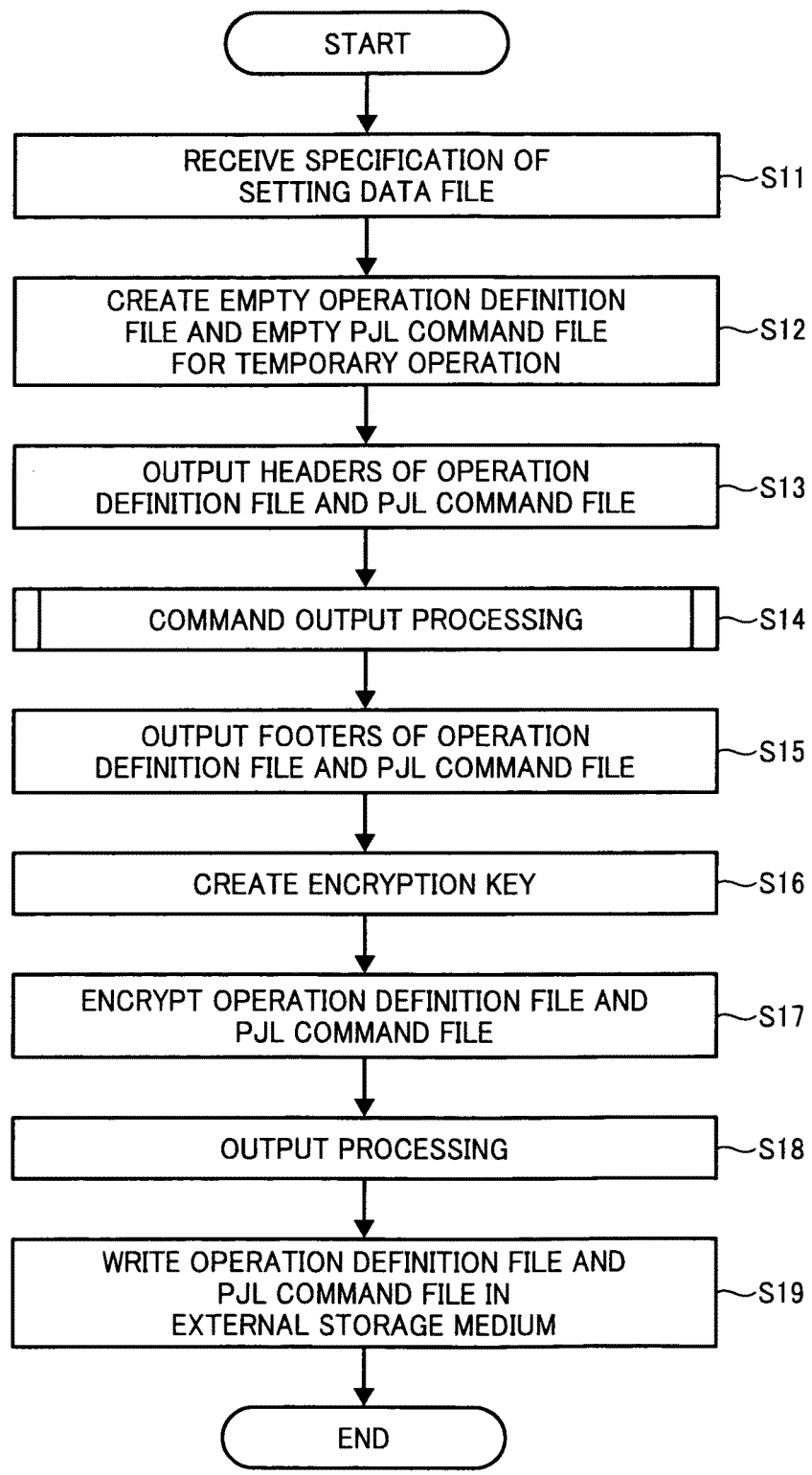
FIG. 7 is a flowchart illustrating a process of creating an operation definition file and a PJL command file.

A process of creating the operation definition file 150 and the PJL command file 160 performed by the operation-definition-file creating apparatus 100 is given below. FIG. 7 is a flowchart illustrating a process of creating the operation definition file 150 and the PJL command file 160.

First, the input unit 111 of the operation-definition-file creating unit 110 in the operation-definition-file creating apparatus 100 receives a specification of the setting data file 140 from the user (Step S11). As a result, each of the items and the input setting data in the specified setting data file 140 are displayed on the display (not shown). With this screen, the user inputs each of the setting items and the setting data that have been described with reference to FIGS. 2 to 4. Upon completion of inputting, the user saves the setting data file 140 and gives an instruction to create the operation definition file 150 and the PJL command file 160.

When the instruction to create the operation definition file 150 and the PJL command file 160 is received, the creating unit 115 creates, in the HDD or the like, an empty operation definition file 150 and an empty PJL command file 160 for a temporary operation (Step S12). Then, the creating unit 115 outputs header portions to the operation definition file 150 and the PJL command file 160 (Step S13). The header portion contains a standard description of each of the files.

Next, the creating unit 115 performs command output processing with respect to the body portions of the operation definition file 150 and the PJL command file 160 (Step S14).

Figure 8:
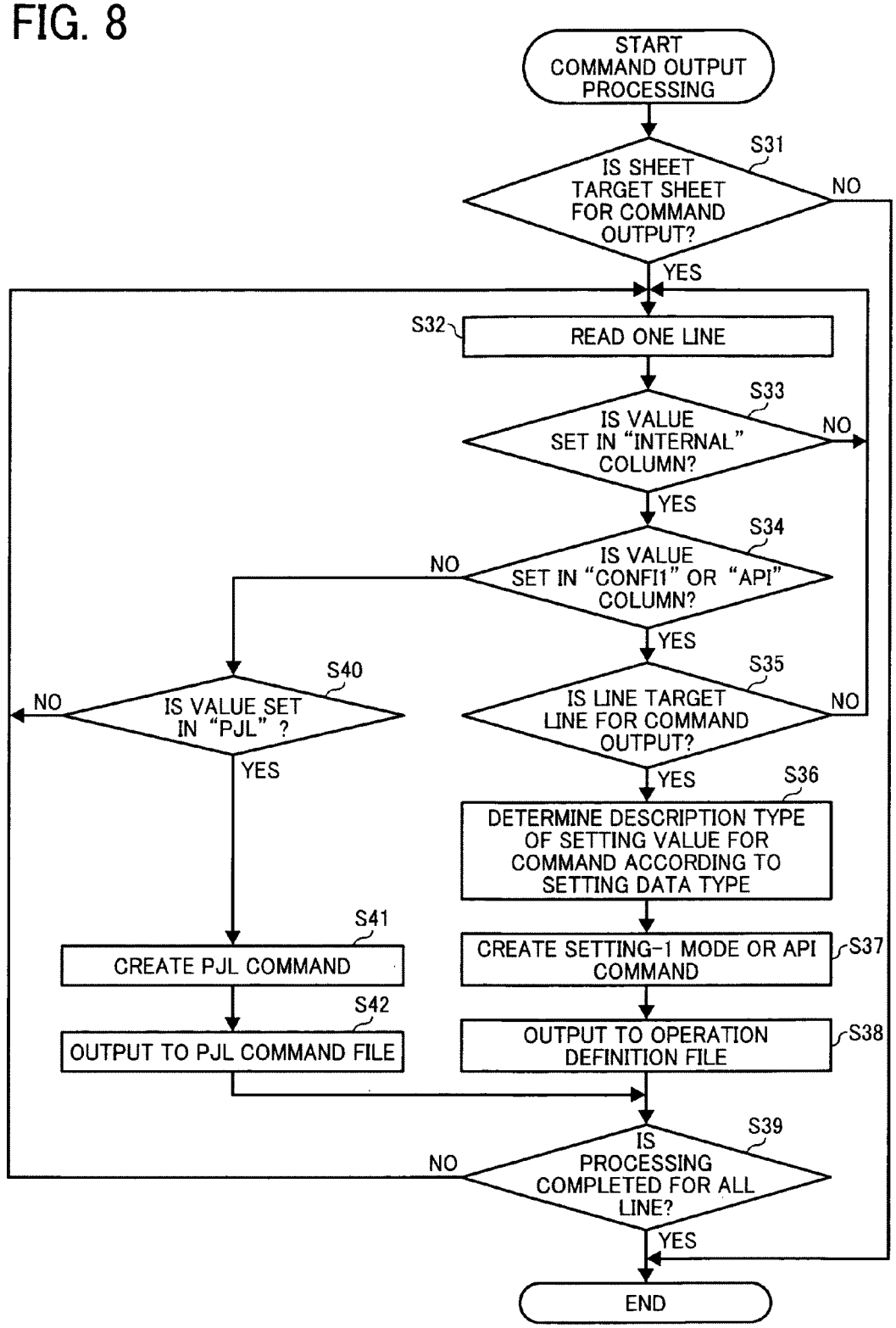
FIG. 8 is a flowchart illustrating command output processing.

FIG. 8 is a flowchart illustrating command output processing. First, the determining unit 112 examines, on the basis of a sheet name or the like, whether the sheet of the setting data file 140 is a target sheet for command output (Step S31).

Then, the determining unit 112 reads one line from the sheet (Step S32), and examines whether setting data (value) is set in the "internal" column (Step S33). If the setting data (value) is not set in the "internal" column (No at Step S33), the process returns to Step S32 and the determining unit 112 reads the next one line.

In contrast, if the setting data (value) is set in the "internal" column (Yes at Step S33), the determining unit 112 examines whether the setting data (value) is set in the "confi1" column or the "API" column (Step S34).

If the setting data (value) is set in the "confi1" column or the "API" column (Yes at Step S34), the determining unit 112 examines whether the line is a target line for command output (Step S35).

If the line is not the target line for command output (No at Step S35), the process returns to Step S32 and the determining unit 112 reads the next one line. In contrast, if the line is the target line for the command output (Yes at Step S35), the determining unit 112 determines a description type of the setting value for the command on the basis of the content of the setting data type ("data type") (Step S36). Then, the creating unit 115 creates a command for the setting-1 mode (setting-1 operation request of the API) or an API command (Step S37) and outputs them to the operation definition file 150 (Step S38).

The process returns to Step S34, and if the determining unit 112 determines that the setting data (value) is not set in the "confi1" column or the "API" column (No at Step S34), the determining unit 112 examines whether the setting data (value) is set in the "PJL" column (Step S40).

If the setting data (value) is not set in the "PJL" column (No at Step S40), the process returns to Step S32 and the determining unit 112 reads the next one line. In contrast, if the setting data (value) is set in the "PJL" column (Yes at Step S40), the creating unit 115 creates the PJL command (Step S41) and outputs it to the PJL command file 160 (Step S42).

The processes from Steps S32 to S42 are repeatedly performed with respect to all of the lines in the setting data file 140 (Step S39), whereby all commands in the body portions are created on the basis of the content of the setting data file 140. At this time, the body portion specifies the setting data.

Referring back to FIG. 7, upon completion of the command output processing, the creating unit 115 outputs footer portions to the operation definition file 150 and the PJL command file 160, respectively (Step S15). The footer portion of the operation definition file 150 mentioned here represents a description that is used to define an operation of the process application 316 in the MFP 300. The footer portion of the PJL command file 160 contains a standard description.

With this operation, all of the contents of the operation definition file 150 and the PJL command file 160 are created.

Figures 11, 12:
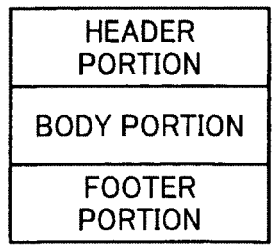
FIG. 11 is an explanatory diagram illustrating an example of a footer portion of the operation definition file.
FIG. 12 is an explanatory diagram illustrating an example of content of the PJL command file.

FIGS. 9 to 11 are explanatory diagrams illustrating examples of the created operation definition file 150. FIG. 9 illustrates an example of a header portion of the operation definition file 150, FIG. 10 illustrates an example of a main body part of the operation definition file 150, and FIG. 11 illustrates an example of a footer portion of the operation definition file 150.

FIG. 12 is an explanatory diagram illustrating an example of a structure of the created PJL command file 160. As shown in FIG. 12, the PJL command file 160 includes a header portion, a body portion, and a footer portion.

Referring back to FIG. 7, when the operation definition file 150 and the PJL command file 160 are created, the encryption processing unit 113 creates an encryption key that is used to encrypt these files (Step S16). The encryption processing unit 113 encrypts, using the created encryption key, the operation definition file 150 and the PJL command file 160 (Step S17), and then performs the output processing to save them in the storage medium such as the HDD or the like (Step S18).

Thereafter, the saving unit 114 writes the operation definition file 150 and the PJL command file 160, which are encrypted and then saved in the storage medium, in the external storage medium 180 (Step S19). As a result, the external storage medium 180 for releasing overseas sales companies is created.

A process of hiding the setting data file 140 performed by the managing unit 120 is described. As described above, all of the data in the setting data file 140 can be displayed; however, there may be a case in which a part of data in the setting data file 140 that is created for development is desired to be released in a hidden manner. In such a case, the managing unit 120 hides some data in the setting data file 140.

Figure 13:
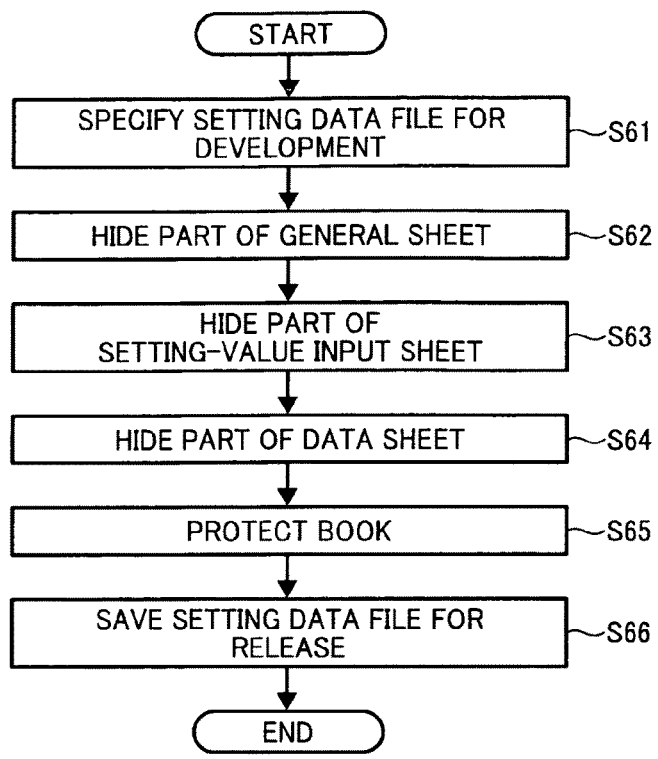
FIG. 13 is a flowchart illustrating a process of hiding the setting data file performed by a managing unit shown in FIG. 1.

FIG. 13 is a flowchart illustrating a process of hiding the setting data file 140 performed by the managing unit 120. First, the managing unit 120 receives specification of the setting data file 140 for use in development (Step S61).

The managing unit 120 hides the setting items and the setting data, which are specified in advance, in the general sheet in the specified setting data file 140 by using a macro or the like (Step S62). Next, the managing unit 120 hides the setting items and the setting data, which are specified in advance, in the setting-value input sheet in the setting data file 140 using a macro or the like (Step S63). The managing unit 120 then hides the setting items and the setting data, which are specified in advance, in the data sheet in the setting data file 140 using a macro or the like (Step S64).

Next, the managing unit 120 protects all books in the setting data file 140 (Step S65) and saves the setting data file 140 created in this way in the storage medium such as the HDD as a release file (Step S66). As a result, the setting data file 140, in which parts of the setting item and the setting data are hidden, used for releasing is created. The setting items and the setting data to be hidden can arbitrarily be set in advance.

Figure 14:
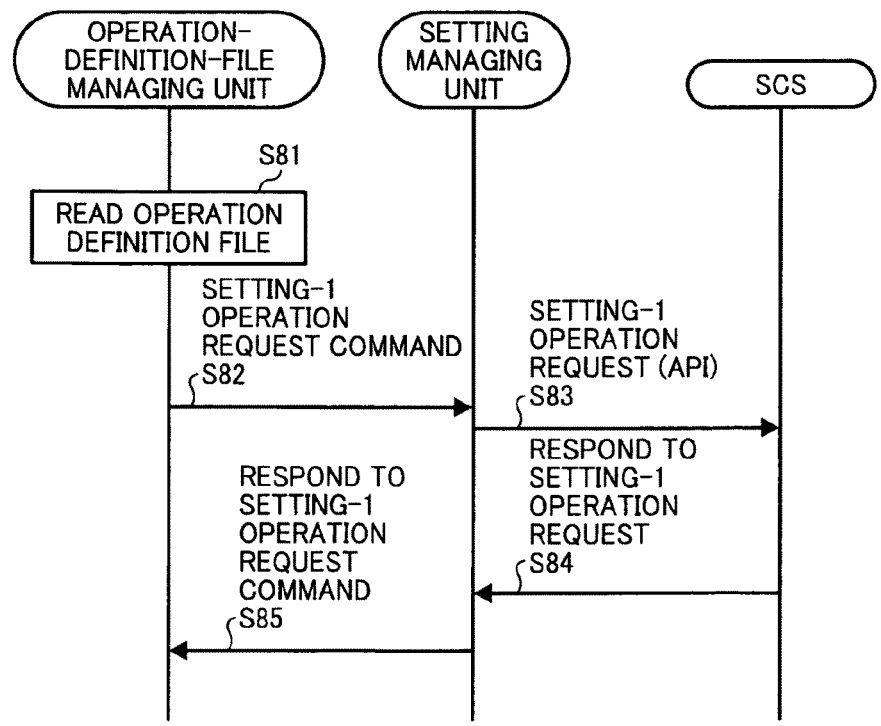
FIG. 14 is a sequence diagram of a setting process in a case where setting data in a setting-1 mode is set in the operation definition file.

A process of setting the MFP 300 using the external storage medium 180 that is created in this way is described below. FIG. 14 is a sequence diagram of a setting process in a case where a setting data in a setting-1 mode is set in the operation definition file 150.

First, the operation-definition-file managing unit 601 reads the operation definition file 150 from the external storage medium 180 (Step S81). At this time, if the operation definition file 150 is in encrypted state, the operation-definition-file managing unit 601 decodes it.

Then, if the operation definition file 150 contains the setting data in the setting-1 mode, the operation-definition-file managing unit 601 sends a setting-1 operation request command, which indicates that the setting data in the setting-1 mode needs to be reflected, to the setting managing unit 602 (Step S82). The setting managing unit 602 that has received the setting-1 operation request command issues, to the SCS 322, a setting-1 operation request of the API that is set in the operation definition file 150 (Step S83). As a result, the setting data in the setting-1 mode is reflected by the SCS 322.

Thereafter, the SCS 322 sends a response with respect to setting-1 operation request to the setting managing unit 602 (Step S84). The setting managing unit 602 that receives the response sends a response with respect to the setting-1 operation request command to the operation-definition-file managing unit 601 (Step S85). As a result, the operation-definition-file managing unit 601 detects that the setting data in the setting-1 mode is reflected in the MFP 300 by the SCS 322.

Figure 15:
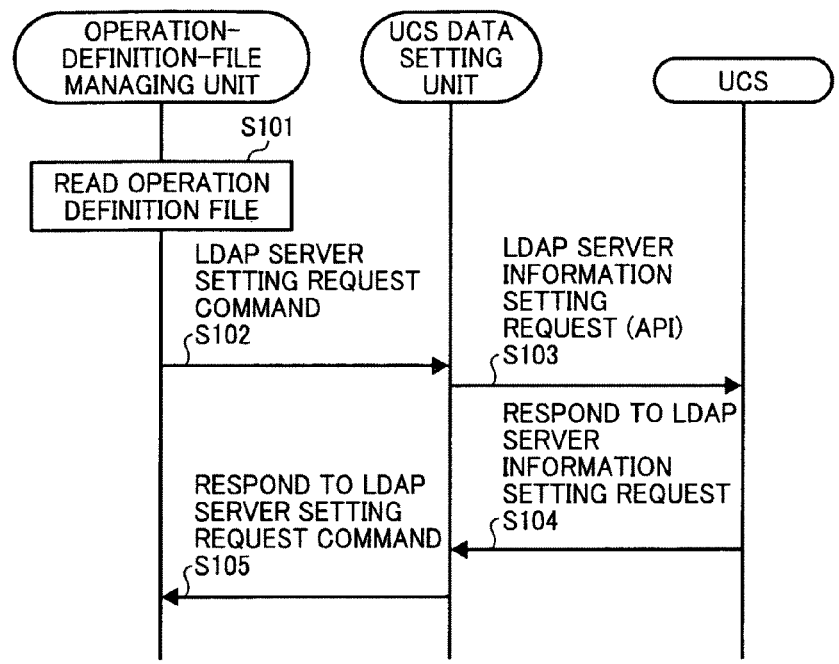
FIG. 15 is a sequence diagram of a setting process in a case where setting data of an API (LDAP server setting) is set in the operation definition file.

FIG. 15 is a sequence diagram of a setting process in a case where a setting data of the API (LDAP server setting) is set in the operation definition file 150.

First, the operation-definition-file managing unit 601 reads the operation definition file 150 from the external storage medium 180 (Step S101). At this time, if the operation definition file 150 is in encrypted state, the operation-definition-file managing unit 601 decodes it.

Then, if the operation definition file 150 contains setting data for setting an LDAP server of the API, the operation-definition-file managing unit 601 sends an LDAP server setting request command, indicating that the setting data for setting the LDAP server needs to be reflected (Step S102), to the UCS data setting unit 603. The UCS data setting unit 603 that has received the LDAP server setting request command outputs, to the UCS 329, a LDAP server information setting request of the API that is set in the operation definition file 150 (Step S103). As a result, the setting data of the LDAP server information is reflected by the UCS 329.

Thereafter, the UCS 329 sends a response with respect to the LDAP server information setting request to the UCS data setting unit 603 (Step S104). The UCS data setting unit 603 that has received the response sends a response with respect to the LDAP server setting request command to the operation-definition-file managing unit 601 (Step S105). As a result, the operation-definition-file managing unit 601 detects that the setting of the LDAP server information is reflected in the MFP 300 by the UCS 329.

Figure 16:
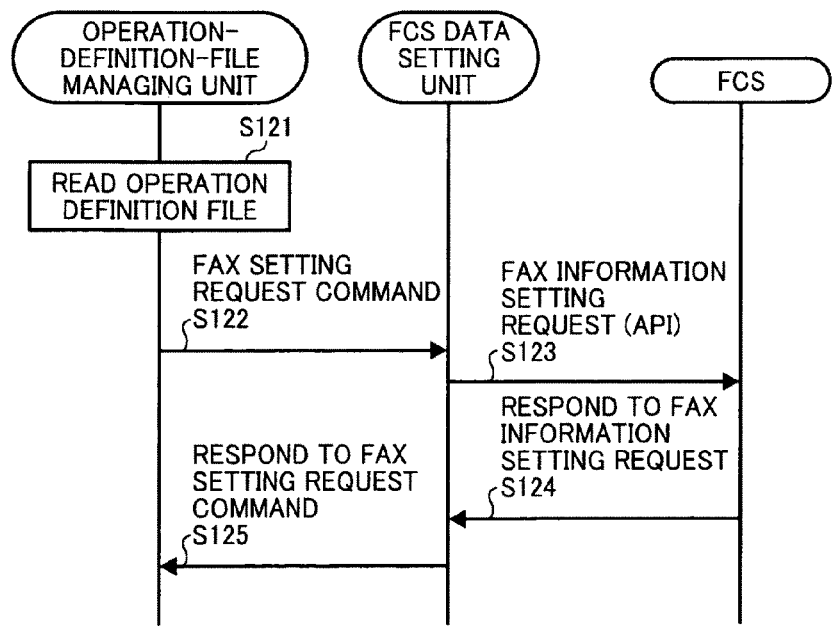
FIG. 16 is a sequence diagram of a setting process in a case where setting data of an API (fax setting) is set in the operation definition file.

FIG. 16 is a sequence diagram of a setting process in a case where setting data of the API (FAX setting) is set in the operation definition file 150.

First, the operation-definition-file managing unit 601 reads the operation definition file 150 from the external storage medium 180 (Step S121). At this time, if the operation definition file 150 is in encrypted state, the operation-definition-file managing unit 601 decodes it.

Then, if the operation definition file 150 contains setting data for setting the FAX of the API, the operation-definition-file managing unit 601 sends a FAX setting request command, indicating that the setting data for setting the FAX needs to be reflected, to the FCS data setting unit 605 (Step S122). The FCS data setting unit 605 that has received the FAX setting request command issues, to the FCS 327, the FAX information setting request of the API that is set in the operation definition file 150 (Step S123). As a result, the setting data of the FAX information is reflected by the FCS 327.

Thereafter, the FCS 327 sends a response with respect to the FAX information setting request to the FCS data setting unit 605 (Step S124). The FCS data setting unit 605 that has received the response sends a response with respect to the FAX setting request command to the operation-definition-file managing unit 601 (Step S125). As a result, the operation-definition-file managing unit 601 detects that the setting of the FAX information is reflected in the MFP 300 by the FCS 327.

Figure 17:
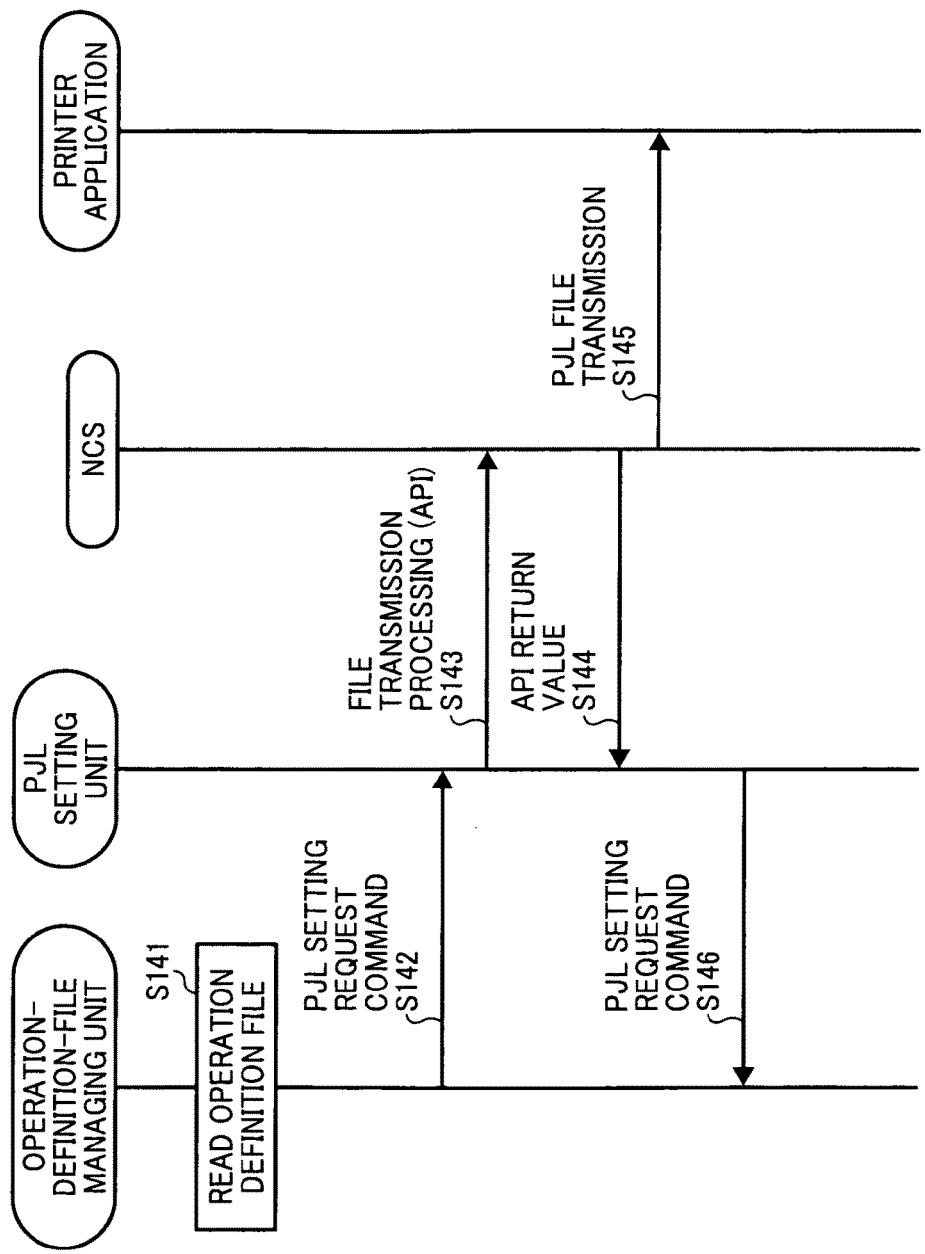
FIG. 17 is a sequence diagram of a setting process performed in accordance with the PJL command file.

FIG. 17 is a sequence diagram of a setting process performed in accordance with the PJL command file 160. First, the operation-definition-file managing unit 601 reads the PJL command file 160 from the external storage medium 180 (Step S141). At this time, if the PJL command file 160 is in encrypted state, the operation-definition-file managing unit 601 decodes it.

Then, the operation-definition-file managing unit 601 sends a PJL setting request command, indicating that the setting data of the PJL command that is set in the PJL command file 160 needs to be reflected in the MFP 300, to the PJL setting unit 606 (Step S142). Upon receiving the PJL setting request command, the PJL setting unit 606 issues, to the NCS 328, the API command to perform a transmission process of a file in which the PJL command that is set in the PJL command file 160 is specified (Step S143). Upon receiving the API command, the NCS 328 sends a return value of the API to the PJL setting unit 606 (Step S144), and then transmits the file containing the PJL command to the printer application 311 (Step S145). The printer application 311 executes the PJL command contained in the transmitted file and reflected the setting in accordance with the PJL command file 160 in the MFP 300.

The PJL setting unit 606 that has received the return value of the API sends a response with respect to the PJL setting request command to the operation-definition-file managing unit 601 (Step S146). As a result, the operation-definition-file managing unit 601 detects that the print setting performed by the PJL command executed by the printer application 311 is reflected in the MFP 300.

As described above, in the first embodiment, the operation definition file 150 and the PJL command file 160 are created from the setting data of the setting data file 140 in which the setting data of the setting item that is set in the MFP 300 is defined. The created operation definition file 150 and the created PJL command file 160 are saved in the external storage medium 180, and the setting data is reflected in accordance with these files in the MFP 300. Accordingly, it is possible to reduce a burden of performing the setting operation of the MFP 300 and shorten the operation time.

Moreover, the operation definition file 150 and the PJL command file 160 can be created in a shorter time and with lesser efforts. Furthermore, the setting operation of the MFP 300 can be performed simply by installing, in the MFP 300, the external storage medium 180 in which the operation definition file 150 and the PJL command file 160 are saved and by starting it up; therefore, even when a large number of MFPs 300 are shipped overseas, the setting operation can be easily performed overseas on site by distributors themselves.

Furthermore, the operation definition file 150 and the PJL command file 160 are encrypted and then saved in the external storage medium 180. These files are decoded when a setting process is performed in the MFP 300. Accordingly, it is possible to prevent an unauthorized third party from intercepting the content of the operation definition file 150 and the PJL command file 160 during a transmission of the external storage medium 180, thus allowing enhancement of security.

In the first embodiment, a series of processes, from a data input into the setting data file 140 to creation of the operation definition file 150 and the PJL command file 160, is performed by the operation-definition-file creating apparatus 100 designed as a single unit. In a second embodiment according to the present invention, the operation definition file 150 and the PJL command file 160 are created on a WEB server on the Internet.

Figure 18:
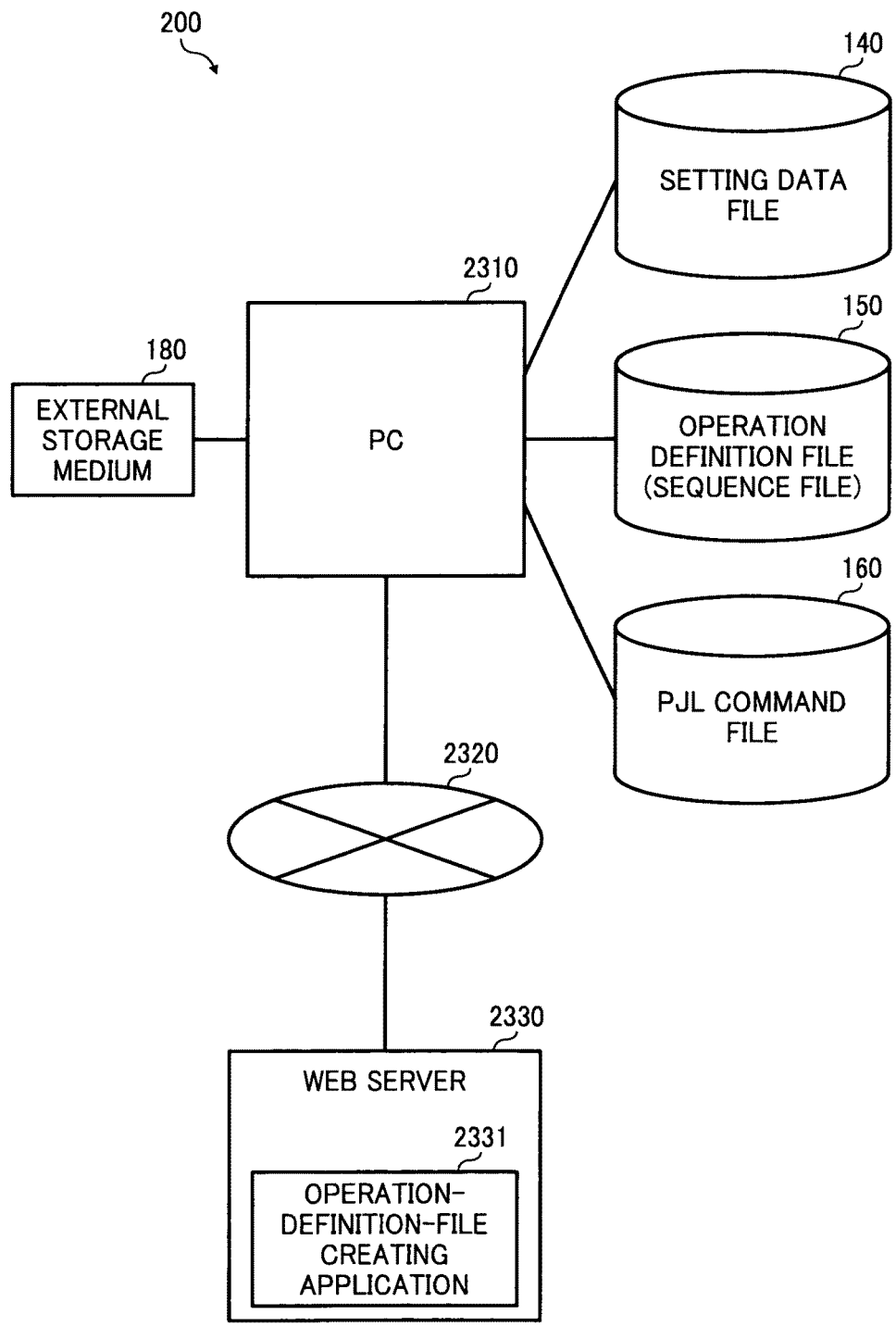
FIG. 18 is an explanatory diagram illustrating the network configuration of an operation-definition-file creating system according to a second embodiment of the present invention.

FIG. 18 is an explanatory diagram illustrating an exemplary network configuration of an operation-definition-file creating system 200 according to the second embodiment. As shown in FIG. 18, the operation-definition-file creating system 200 is configured in such a manner that a PC (Personal Computer) 2310 and a WEB server 2330 are connected via a network 2320 such as the Internet or the like.

The PC 2310 has a configuration similar to that commonly used for a computer including a CPU, a memory, and a storage medium such as an HDD. The setting data file 140 is saved in the storage medium such as the HDD or the like. In addition, the PC 2310 receives the operation definition file 150 and the PJL command file 160 created in the WEB server 2330 and saves them in the storage medium. Furthermore, the PC 2310 includes an external storage medium interface (not shown) and stores the operation definition file 150 and the PJL command file 160 in the external storage medium 180.

An operation-definition-file creating application 2331 serving as a WEB application is operated on the WEB server 2330. The operation-definition-file creating application 2331 receives the setting data file 140 from the PC 2310, creates the operation definition file 150 and the PJL command file 160 by using the same set of process sequence as that in the first embodiment, and sends the created files to the PC 2310. The functional configuration of the operation-definition-file creating application 2331 is the same as that of the operation-definition-file creating unit 110 described in the first embodiment. The WEB server 2330 has a configuration similar to that commonly used for a computer including a CPU, a memory, and a storage medium such as an HDD.

Figure 19:
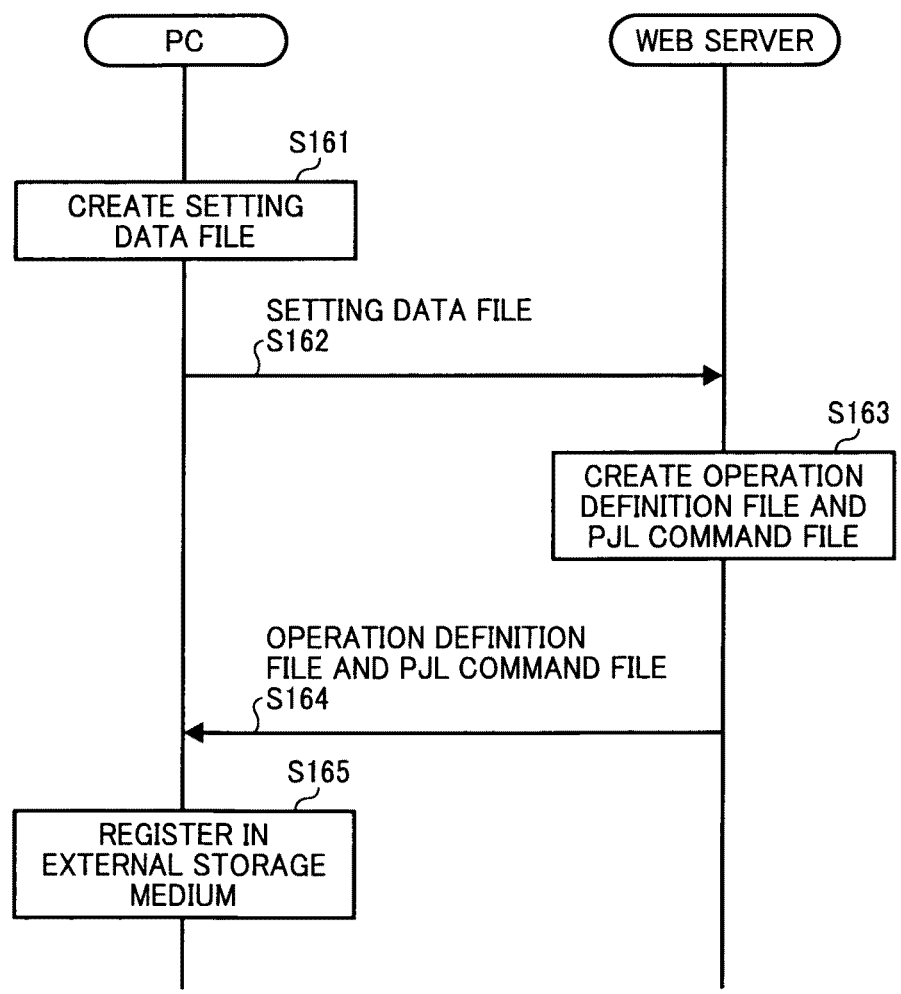
FIG. 19 is a flowchart illustrating a process of creating an operation definition file and a PJL command file according to the second embodiment.

FIG. 19 is a flowchart of a process of creating the operation definition file 150 and the PJL command file 160 according to the second embodiment. First, the user creates the setting data file 140 in the same manner as in the first embodiment on the PC 2310 (Step S161) and sends the created setting data file 140 to the WEB server 2330 via the network 2320 (Step S162).

Upon receiving the setting data file 140, the WEB server 2330 activates the operation-definition-file creating application 2331. As a result, the operation-definition-file creating application 2331 creates the operation definition file 150 and the PJL command file 160 on the basis of the content of the setting data file 140 (Step S163). The specific creating process performed is the same as that in the first embodiment.

Then, the operation-definition-file creating application 2331 sends the created operation definition file 150 and the created PJL command file 160 to the PC 2310 (Step S164). The PC 2310 registers the received operation definition file 150 and the received PJL command file 160 in the external storage medium 180 (Step S165).

As described above, in the second embodiment, because the WEB server 2330 creates the operation definition file 150 and the PJL command file 160, even when a number of persons are in charge of creating the setting data file, it is not necessary to install an operation-definition-file creating tool for each PC that is used by each person involved in creating the setting data file, thus improving operation efficiency.

Furthermore, the WEB server 2330 creates the operation definition file 150 and the PJL command file 160, and the operation-definition-file creating application is the WEB application; therefore, the development of the operation-definition-file creating application is easy.

Third Embodiment

In the second embodiment, the PC 2310 stores therein the setting data file 140, the WEB server 2330 creates the operation definition file 150 and the PJL command file 160, and the PC 2310 receives the created operation definition file 150 and the created PJL command file 160. In a third embodiment according to the present invention, the setting data file 140 is stored in the WEB server itself.

Figure 20:
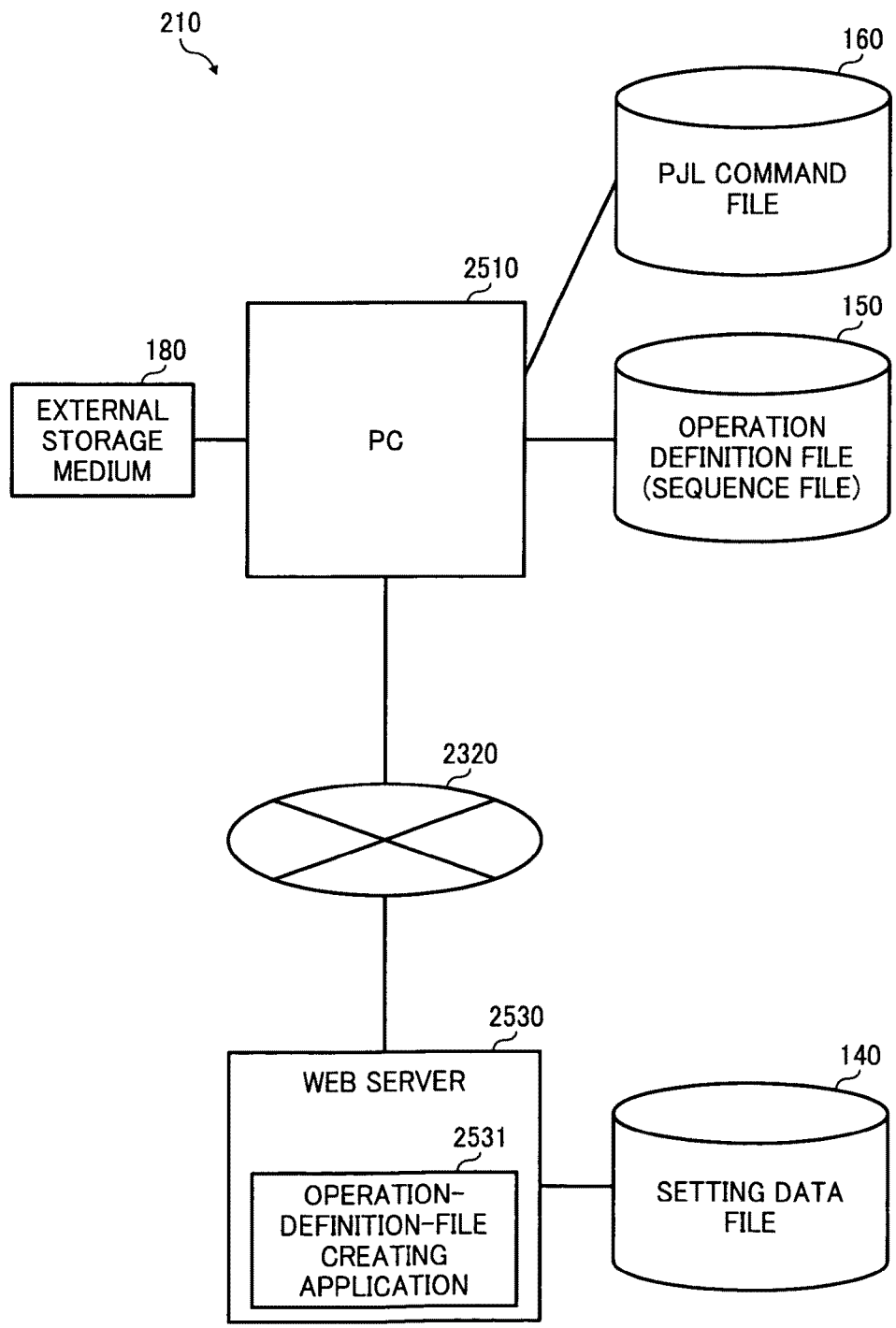
FIG. 20 is an explanatory diagram illustrating the network configuration of an operation-definition-file creating system according to a third embodiment of the present invention.

FIG. 20 is an explanatory diagram illustrating the network configuration of an operation-definition-file creating system 210 according to the third embodiment. As shown in FIG. 20, an operation-definition-file creating system 210 is configured in such a manner that a PC 2510 and a WEB server 2530 are connected via a network such as the network 2320.

The PC 2510 has a configuration similar to that commonly used for a computer including a CPU, a memory, and a storage medium such as an HDD. The setting item or setting data is input to the setting data file 140 stored in the WEB server 2330 using a technology such as Active X (registered trademark), and, on the basis of this, the PC 2510 receives the operation definition file 150 and the PJL command file 160 created by the WEB server 2530 and stores them in the storage medium such as the HDD. Furthermore, the PC 2510 includes an external storage medium interface (not shown), and the operation definition file 150 and the PJL command file 160 are stored in the external storage medium 180.

The WEB server 2530 stores the setting data file 140 in the storage medium such as the HDD or the like. An operation-definition-file creating application 2531 serving as a WEB application is operated on the WEB server 2530. The operation-definition-file creating application 2531 creates the operation definition file 150 and the PJL command file 160 in the same process as that in the first embodiment and sends them to the PC 2510. The functional configuration of the operation-definition-file creating application 2531 is the same as that of the operation-definition-file creating unit 110 in the first embodiment. The WEB server 2530 has a configuration similar to that commonly used for a computer including a CPU, a memory, and a storage medium such as an HDD.

Figure 21:
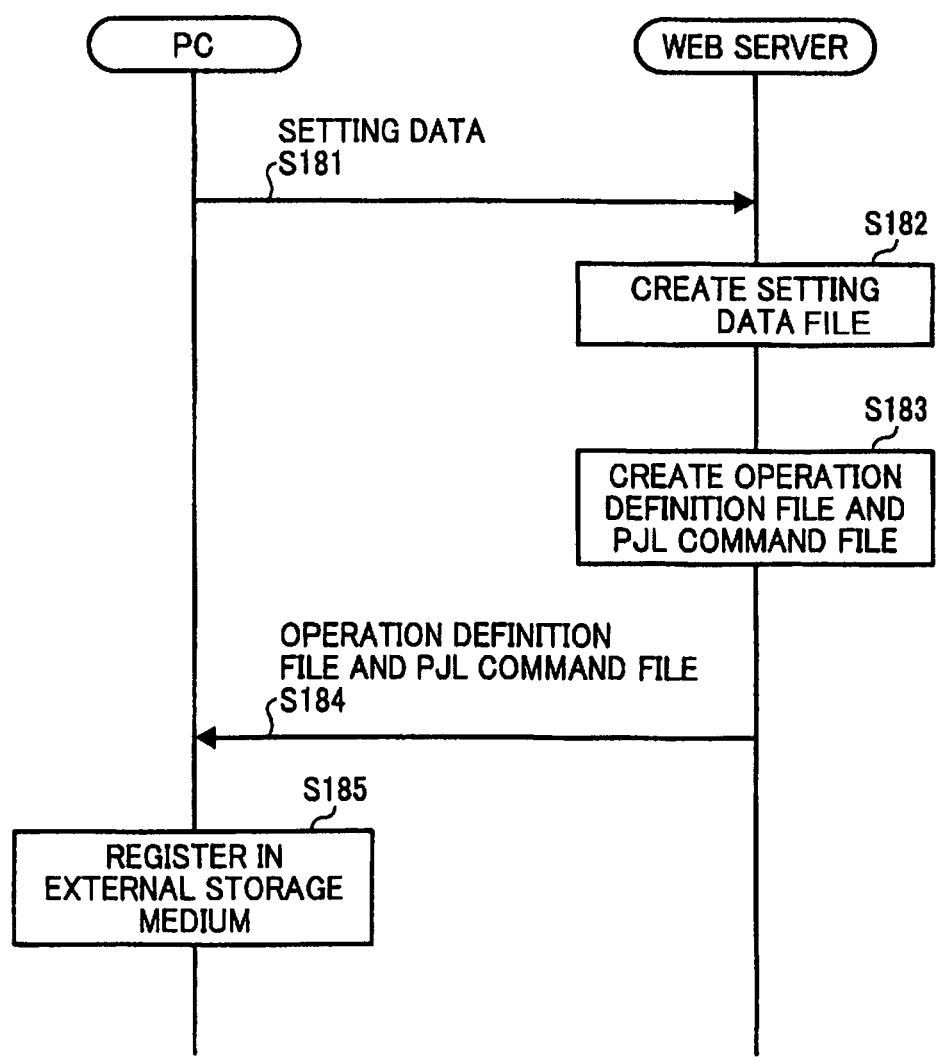
FIG. 21 is a flowchart illustrating a process of creating an operation definition file and a PJL command file according to the third embodiment.

FIG. 21 is a flowchart of a process of creating the operation definition file 150 and the PJL command file 160 according to the third embodiment. First, the user inputs the setting data or the like to the WEB server 2530 on the PC 2510 (Step S181). The WEB server 2530 creates the setting data file 140 from the input data (Step S182).

Next, when the setting data file 140 is created, the WEB server 2530 activates the operation-definition-file creating application 2531 and creates the operation definition file 150 and the PJL command file 160 on the basis of the content of the setting data file 140 using the operation-definition-file creating application 2531 (Step S183). The specific creating process performed is the same as that in the first embodiment.

Then, the operation-definition-file creating application 2531 sends the created operation definition file 150 and the created PJL command file 160 to the PC 2510 (Step S184). The PC 2510 registers the received operation definition file 150 and the received PJL command file 160 in the external storage medium 180 (Step S185).

As described above, the third embodiment offers the same advantages as those according to the second embodiment. Furthermore, because the setting data file 140 is stored on the WEB server 2530, even when the setting data file 140 is expanded, the state thereof can be easily reflected.

In the first, second, and third embodiments described above, the operation definition file 150 and the PJL command file 160 are saved in the external storage medium 180 via the external storage medium I/F 130; however, the present invention is not limited thereto. The operation definition file 150 and the PJL command file 160 can be saved in another storage medium such as a USB memory or the like.

The operation-definition-file creating apparatus 100 according to the first embodiment and an operation-definition-file creating program that is executed by the operation-definition-file creating application 2331 and 2531 according to the second and third embodiments can be configured such that files are stored, in an installable or executable manner, in a computer readable recording medium, such as a CD-ROM, a flexible disk (FD), a CD-R, a digital versatile disk (DVD), or the like.

Furthermore, the operation-definition-file creating apparatus 100 according to the first embodiment and the operation-definition-file creating program that is executed by the operation-definition-file creating application 2331 and 2531 according to the second and third embodiments can be configured to be stored in a computer connected to the network such as the Internet and be downloaded via the network. The operation-definition-file creating apparatus 100 according to the first embodiment and the operation-definition-file creating program that is executed by the operation-definition-file creating applications 2331 and 2531 according to the second and third embodiments can be configured to be provided or distributed via a network such as the Internet or the like.

The operation-definition-file creating apparatus 100 according to the first embodiment and the operation-definition-file creating program that is executed by the operation-definition-file creating applications 2331 and 2531 according to the second and third embodiments can be configured to be included in advance in a ROM or the like.

The operation-definition-file creating apparatus 100 according to the first embodiment and the operation-definition-file creating program that is executed by the operation-definition-file creating applications 2331 and 2531 according to the second and third embodiments have a modular structure including the above described units (the input unit 111, the determining unit 112, the creating unit 115, the encryption processing unit 113, and the saving unit 114). When a hardware is actually used, the CPU (processor) reads the operation-definition-file creating program from the storage medium and executes it, whereby the above described units are loaded into the main storage device, and then the input unit 111, the determining unit 112, the creating unit 115, the encryption processing unit 113, and the saving unit 114 are created in the main storage device.

The present invention is not limited to the embodiments described above. For example, in an implementation phase, modifications of components can be embodied so long as they do not depart from the spirit of the present invention. Furthermore, various inventions can be formed by appropriately combining a plurality of components disclosed in the above embodiments. For example, some components can be eliminated from all of the components described in the above embodiments. Furthermore, components described in the different embodiments can be appropriately used in combination.

According to an aspect of the present invention, on the basis of setting data of a setting data file in which setting data of a setting item that is set in an image forming apparatus is defined, an operation definition file is created in which an operation for reflecting the setting data in the image forming apparatus is described and the created operation definition file in an external storage medium is stored. Accordingly, an advantage is provided in that a setting operation for the image forming apparatus can be performed, simply by mounting the external storage medium, storing the operation definition file created in such a manner, on the image forming apparatus and activating the external storage medium, and therefore, a setting operation can be easily performed by a distributor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operation-definition-file creating apparatus comprising:
 a storing unit that stores therein a setting data file in which setting data is defined, the setting data including a setting value;
 a determining unit configured to determine whether the setting value of the setting data corresponds to a setting item for an image forming apparatus;
 a creating unit configured to create, on the basis of the setting data, operation definition data in which an operation for the setting item, and respective commands corresponding to the operation, are defined in the operation definition data, if the determining unit determines that the setting value corresponds to a setting item for the image forming apparatus; and
 a saving unit that saves the created operation definition data in an external storage medium,
 the determining unit configured to determine whether the setting data is data related to a printer job language for the image forming apparatus, when the determining unit determines that the setting data is the data related to the printer job language,
 the creating unit further configured to create, using a command for the printer job language, a command file described in the printer job language, and the saving unit configured to save the created command file in the external storage medium.

2. The operation-definition-file creating apparatus according to claim 1, further comprising the determining unit configured to determine whether the setting data in the setting data file is administrator data that can be used only by an administrator, wherein when the determining unit determines that the setting data is the administrator data, the creating unit creates the operation definition data using a command related to the administrator data.

3. The operation-definition-file creating apparatus according to claim 1, further comprising the determining unit configured to determine whether the setting data is data related to an API command provided by an application program interface (API) in the image forming apparatus, wherein when the determining unit determines that the setting data is the data related to the API command, the creating unit further creates the operation definition data using the API command.

4. The operation-definition-file creating apparatus according to claim 1, further comprising an encryption processing unit that performs encryption of the operation definition data and the command file that are created by the creating unit, wherein the storing unit stores, in the external storage medium, the operation definition data and the command file that are subjected to encryption.

5. The operation-definition-file creating apparatus according to claim 1, further comprising a managing unit that performs hiding of the setting item in the setting data file.

6. The operation-definition-file creating apparatus according to claim 1, wherein the creating unit creates the operation definition data with a description in a predetermined command language.

7. A method of creating operation definition data that is executed in an operation-definition-file creating apparatus, the method comprising:

storing, in a storing unit, a setting data file in which setting data is defined, the setting data including a setting value;

determining, by a determining unit, whether the setting value of the setting data corresponds to a setting item for an image forming apparatus;

creating, by a creating unit, the operation definition data in which an operation for reflecting the setting data, and respective commands corresponding to the operation, are defined in the operation definition data, if the determining unit determines that the setting value corresponds to a setting item for the image forming apparatus; and saving the created operation definition data in an external storage medium, further determining, by the determining unit, whether the setting data is data related to a printer job language for the image forming apparatus, when the determining unit determines that the setting data is the data related to the printer job language, further creating, by the creating unit, a command file described in the printer job language using a command for the printer job language, and saving the created command file in the external storage medium.

8. A computer program product that includes a non-transitory computer-readable recording medium and a computer program recorded on the non-transitory computer-readable recording medium, the computer program when read and executed on a computer causes the computer to execute a method of creating operation definition data that is executed in an operation-definition-file creating apparatus, the computer program causing the computer to execute:

storing, in a storing unit, a setting data file in which setting data is defined, the setting data including a setting value;

determining, by a determining unit, whether the setting value of the setting data corresponds to a setting item for an image forming apparatus;

creating, by a creating unit, the operation definition data in which an operation for the setting item, and respective commands corresponding to the operation, are defined in the operation definition data, if the determining unit determines that the setting value corresponds to a setting item for the image forming apparatus; and saving the created operation definition data in an external storage medium, further determining, by the determining unit, whether the setting data is data related to a printer job language for the image forming apparatus, when the determining unit determines that the setting data is the data related to the printer job language, further creating, by the creating unit, a command file described in the printer job language using a command for the printer job language, the saving unit further saving the created command file in the external storage medium.

\* \* \* \* \*